Nov. 13, 1951            V. R. NOLL            2,574,751
ENGINE FOR PRODUCING RECIPROCATORY MOTION HAVING SUBSTANTIALLY
CONSTANT VELOCITY EXCEPT DURING REVERSALS
Filed Dec. 3, 1948            4 Sheets-Sheet 1

INVENTOR.
VINCENT R. NOLL
BY
*John W. Michael*
ATTORNEY

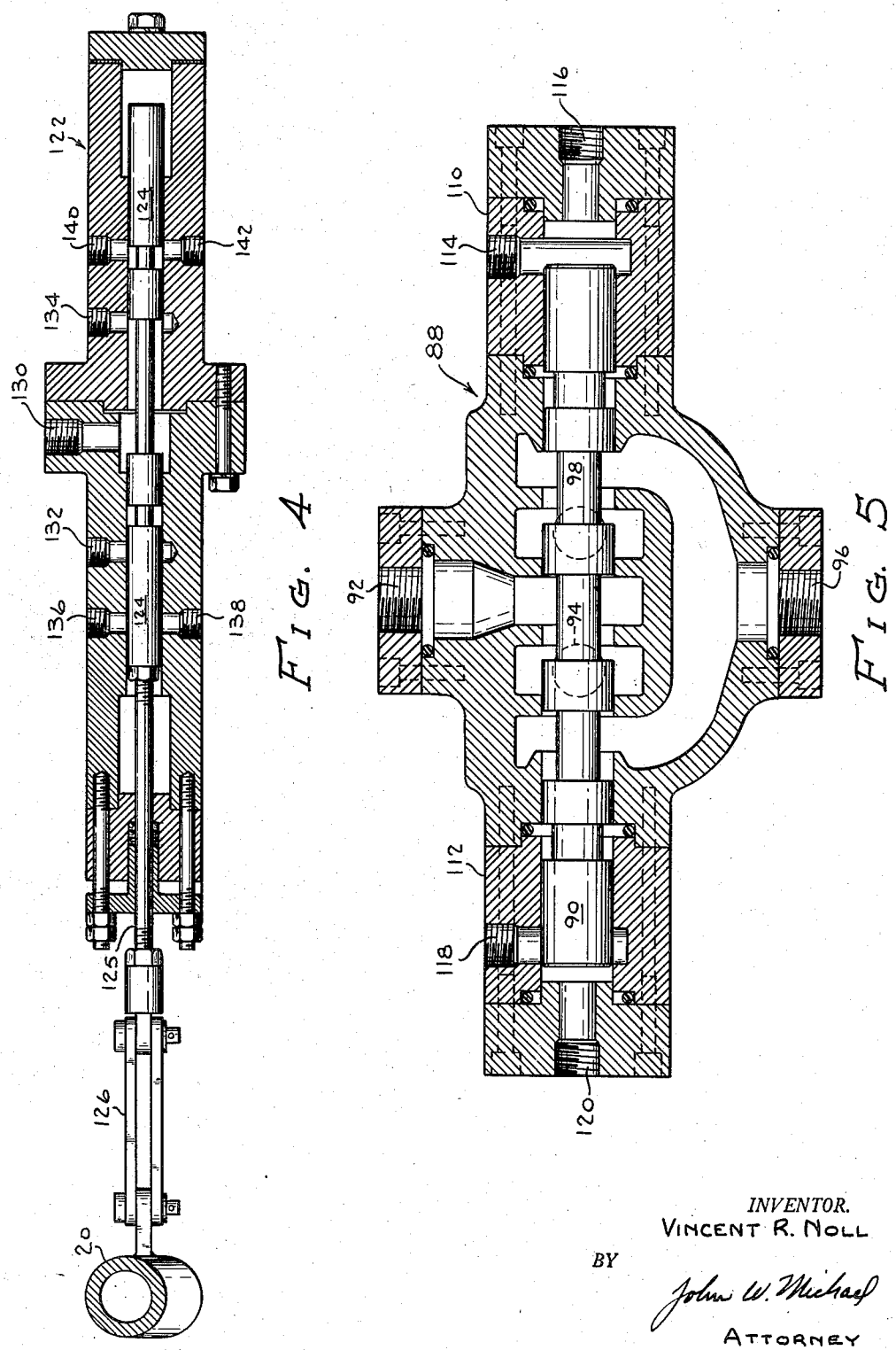

Patented Nov. 13, 1951

2,574,751

UNITED STATES PATENT OFFICE 2,574,751

ENGINE FOR PRODUCING RECIPROCATORY MOTION HAVING SUBSTANTIALLY CONSTANT VELOCITY EXCEPT DURING REVERSALS

Vincent R. Noll, Milwaukee, Wis., assignor to The Filer & Stowell Co., Milwaukee, Wis., a corporation of Wisconsin Application December 3, 1948, Serial No. 63,393

10 Claims. (Cl. 60—52)

This invention relates to improvements in engines, particularly to the type designed to produce reciprocatory or oscillating motion.

Engines of this type have limited use because: the velocity between reversals is widely variable and usually accelerates from zero to maximum velocity and back to zero during the entire stroke, and the rate of oscillation of a relatively large mass is too slow.

It is an object of this invention, therefore, to provide an engine for producing oscillatory movement, the velocity of which is substantially constant except during the time required for reversal.

Another object of the invention is to provide an oscillatory engine which can oscillate from one hundred and fifty to three hundred and sixty times per minute (an oscillation being two successive strokes) while moving a mass of approximately two hundred and fifty pounds back and forth over a path of substantially eleven and one-half inches and which utilizes only a small per cent of the total time of a complete oscillation to effect two reversals of direction.

Another object of this invention is to provide a cushioning device for an oscillatory engine which will absorb and discharge relatively large quantities of energy during the periods of reversal so that a relatively small amount of energy is required to maintain substantially constant velocity between such periods of reversal.

A still further object of this invention is to provide in an oscillatory engine a hydraulic system for supplying constant oppositely alternating velocity to the oscillating member between reversals of such member which system is reversed under control of the time consumed in the reversal of the oscillating member.

These objects are obtained by providing a fluid power operated reciprocal power cylinder which motivates an operating member at constant velocity in alternating opposite directions and a cushion cylinder which stores and releases energy as it stops and starts the operating member at each end of the stroke. A supply of hydraulic fluid under constant volumetric flow per minute is connected to the power cylinder through a four-way valve which in turn is hydraulically operated by the joint action of a pilot valve controlled by the movement of the operating member and the excess in volume of hydraulic fluid made available by the retarding and stopping of the power cylinder by the cushion cylinder. The cushion cylinder is valveless but has a central open port which is closed by its piston as the piston approaches each end of its travel. A compressible medium is trapped in the ends of the cushion cylinder and is compressed to develop energy which stops the piston and reverses its motion. The act of slowing down the piston of the cushion cylinder also slows down the operating member and the piston of the power cylinder. Thus there is less space in the power cylinder for the hydraulic fluid. The excess of hydraulic fluid is then applied to one of the operating ends of the four-way valve to move that valve through neutral (blocked) position to the reverse position. The connection of the hydraulic fluid to the proper operating end of the four-way valve is accomplished by the opening of the pilot valve as the piston of the cushion cylinder closes the port. The cubic volume of each operating end of the four-way valve is designed to accommodate the volume of hydraulic fluid delivered by the source during the stopping and starting period of the piston of the power cylinder. The volume of hydraulic fluid so delivered varies with the time consumed in stopping and reversing the piston of the power cylinder. This time depends on the energy developed and expended in the cushion cylinders. The cushion cylinder therefore has a relatively large diameter compared to that of the power cylinder and it is desirable to provide means for regulating the basic or initial pressure within the cylinder in order to control the ultimate pressures developed in each end. These ultimate pressures determine the reversal time and unless the proportions (both of mass and volume) are exactly as precalculated some adjustment of reversal time must be capable to bring the engine into proper timing. However, once the timing is set the speed of oscillation may be controlled by adjusting the volumetric flow per minute of the hydraulic fluid. With this arrangement most of the operating pressures are supplied by the cushion cylinder and the hydraulic system need only supply enough power to overcome frictional losses. A feature of the hydraulically operated four-way valve is the incorporation in each operating end of both an inlet and an outlet port. This permits that valve to be connected so that it readily operates under control of the excess hydraulic fluid supplied during reversal.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 4 is an enlarged sectional view of the pilot control valve;

Fig. 5 is an enlarged sectional view of the hydraulically operated four-way control valve;

Fig. 6 is an enlarged sectional view of the cushion cylinder; and

Fig. 7 is a sectional view taken on line 7—7 of Fig. 6.

Figure 1:
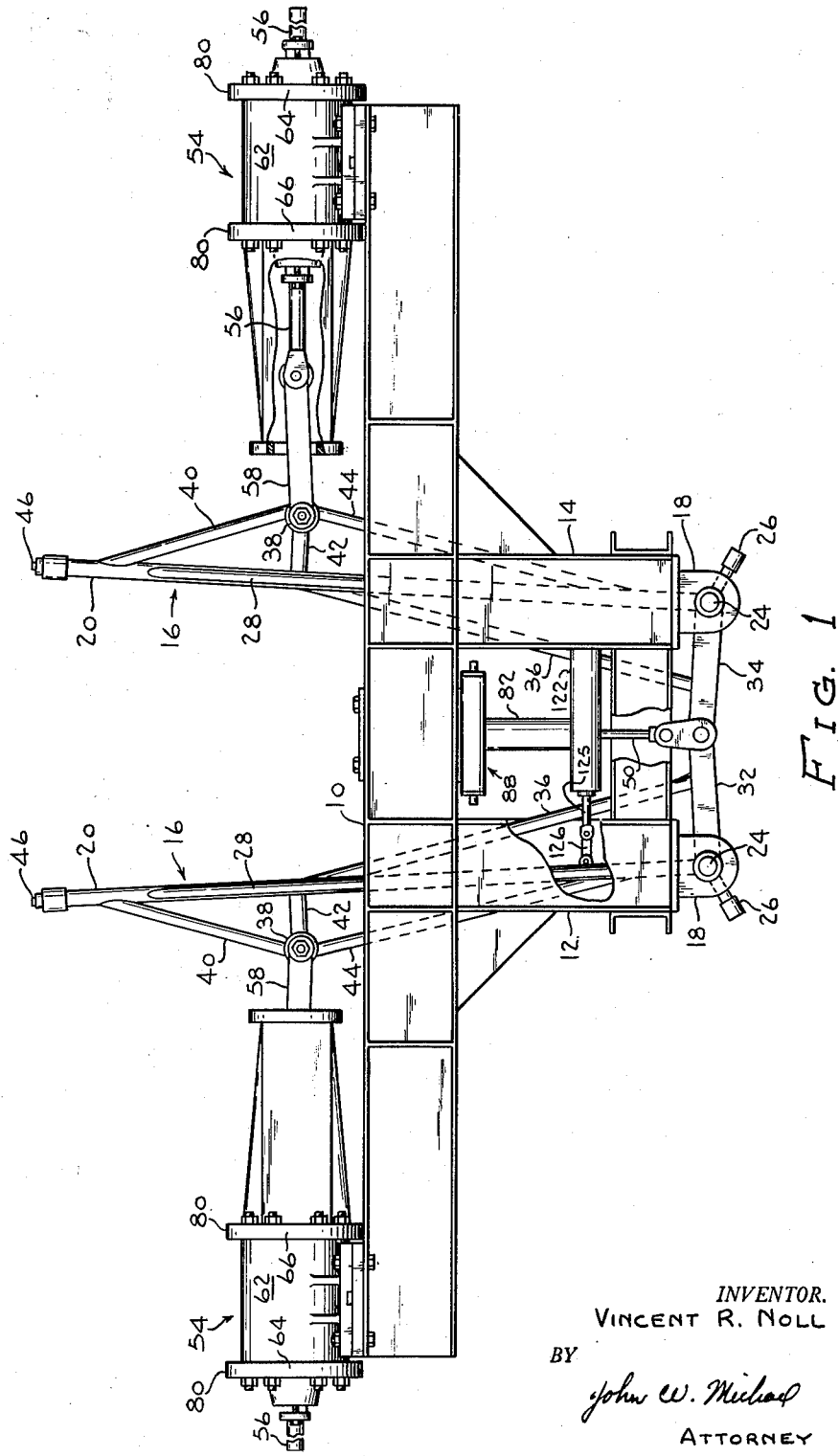
Fig. 1 is a view in side elevation of an oscillator for a hydraulic barker embodying the reciprocal engine of the present invention.
Figure 2:
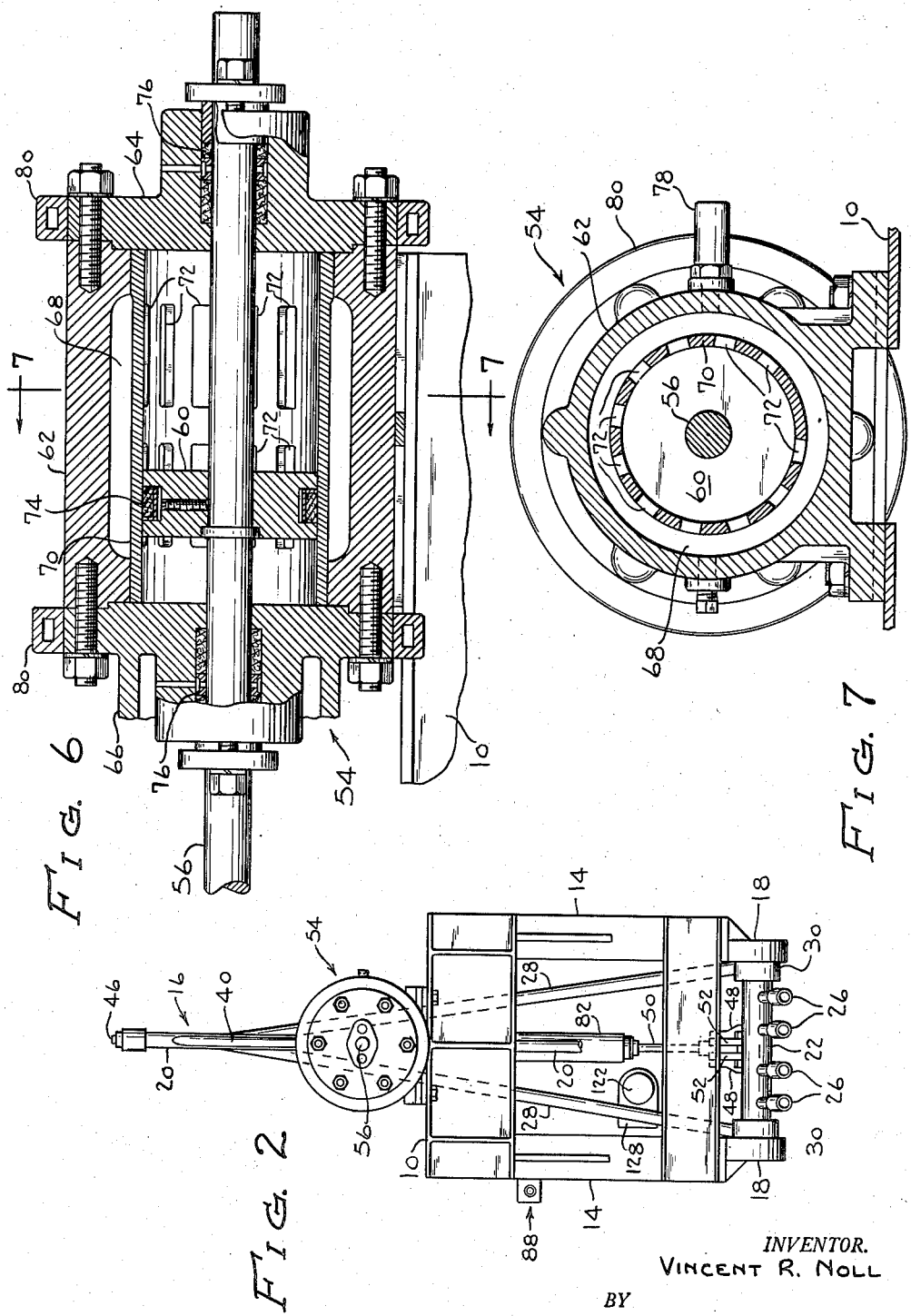
Fig. 2 is a right-hand end elevation of the engine viewed in Fig. 1.

Referring to the drawings by reference numerals, the reciprocal engine is shown embodied in an oscillator for a hydraulic barker. In such application the logs are advanced and rotated (apparatus not shown) above the nozzle arms in such a way that traveling jets of water delivered at approximately 1,000 gallons per minute at 1,500 p. s. i. from the nozzle arms continuously remove a strip of bark about four feet in width.

It is essential that the jets of water scan the log at virtually constant speed except during the periods of reversal. If the speed of the jets varies, their action on the log would be uneven and the bark would not peel off in a satisfactory manner or the log itself may be damaged. This type of debarker is advantageous in that it can be used with any length of log and with logs of considerable variation in diameter. An average log may be debarked in approximately a minute and to accomplish this the jets must travel with a velocity of approximately 1200 feet per minute. Considering that the nozzle arms must handle water pressures in the neighborhood of 2000 p. s. i. and must oscillate at rapid speed, they have to be ruggedly constructed and as a result have a mass at their center of percussion of approximately 250 pounds. Such a mass moving at that velocity requires a force in the neighborhood of 20,000 pounds to effect a rapid stopping and reversal of direction. If the device is to be efficient in operation the time required for stopping and reversing of the nozzle arms must be maintained at a small percentage of the time consumed for a stroke.

The reciprocatory engine herein described meets these requirements. However, reciprocatory engines capable of producing similar characteristics of rapidity of oscillation, substantially constant velocity between reversals, and using only a small percentage of the time consumed for a stroke in the stopping and reversing, have many other types of application which will not require the same degree of mass and structural strength.

The reciprocatory engine is mounted on a heavy frame having horizontal members 10 and spaced, downwardly-projecting vertical members 12 and 14. A pair of nozzle arms 16 of substantially identical construction are pivotally mounted at their lower ends in bearings 18 secured to the bottom of members 12 and 14. Each nozzle arm consists of a heavy central pipe 20 connected at its bottom with a transverse tubular member 22 which acts as a header. The ends of the header 22 are provided with trunnions 24 which are mounted in the bearings 18 to form the pivotal mounting for the nozzle arm. A plurality of hose connectors 26 extend from the header 22 to connect it with flexible hoses for supplying water under pressure. Each pipe 20 is strengthened by tie rods 28 extending from collars 30 on the header to the upper end of the nozzles. Each nozzle arm has a lever projecting from the header 22 by which it is oscillated about its pivot connection. As viewed in Fig. 1 the left-hand nozzle arm has a double lever 32 and the right-hand nozzle arm has a single lever 34, the single lever 34 extending within the ends of the double lever 32. A strengthening brace 36 extends from the lever 32 to the middle of the pipe 20. Each nozzle arm has a bearing 38 for connecting the nozzles to the cushion cylinders. These bearings are positioned substantially fifty-four and one-half inches from the pivotal axis of the arms and are secured to the pipe 20 by brace-like pipes 40, 42, and 44. If necessary greater rigidity may be obtained by interposing web-like plates between the pipe 20 and the pipes 40 and 42 and the pipe 20 and pipes 42 and 44. In the upper end of the nozzle arms 16 there is provided a nozzle 46 which forms the water forced from the nozzle arms into a jet. Water is continuously furnished to each nozzle arm from a source not shown at a rate of 1,000 gallons per minute under pressures of 1,500 p. s. i. by means of flexible hoses engaged with connectors 26. The water enters the headers 22, passes up the interior of the pipes 20 and is ejected through the nozzles 46. The flexible connection permits the nozzle arms 16 to pivot from the full line position shown in Fig. 3 toward each other to the position shown in dotted lines. The nozzles 46 travel approximately eighteen inches from their outermost to their innermost position. However, since a log is positioned approximately thirty-two inches away from the nozzles the path of each jet of water as it strikes the log will be approximately twenty-four inches in length. As the nozzle arms 16 oscillate through such range of travel the crank ends of the levers 32 and 34 will move up and down through an arc of substantially four inches. The lever 32 is connected by a pair of links 48 to the piston rod 50 and the lever 34 is likewise connected to the piston rod 50 by a pair of links 52. These links provide for the relative lateral movement between the piston rod 50 and the levers 32 and 34 as the piston rod is reciprocated by the power cylinder.

As heretofore mentioned, the stopping and starting of each nozzle arm requires a force in the neighborhood of 20,000 pounds. This is generated in a pair of cushion cylinders 54. The piston rod 56 of each cylinder is connected by a connecting rod 58 to the bearing 38 and as the nozzle arms 16 reciprocate a piston 60 reciprocates within the cushion cylinder 54. Each cushion cylinder consists of a cylindrical outer wall 62, a back head 64, and a front head 66. This latter head, as is standard practice in the steam cylinder art, also constitutes the crosshead guide for the piston rod 56. The interior of the outer wall 62 has an encircling recess 68 which constitutes a passageway for the compressed air as the piston moves between the ends of the internal ports. Each cylinder has a liner 70 with a plurality of slot-like ports 72 arranged as indicated. Whenever the piston 60 is moving between the ends of these ports, the compressed air within the cylinder will circulate to either side of the piston and no appreciable compression will take place. The piston 60 is provided with a centrally located piston ring 74 and each of the heads 64 and 66 has a piston rod packing and gland 76 all of suitable construction well known for use with compressed air or gas. A cooling ring, indicated at 80, encircles each of the heads to help keep the piston and heads from becoming too hot in operation and thus prevent carbonization of lubricating oil and injury to the packing. The outer end of the piston rod 56 is a tail rod and is present only for the purpose of maintaining the same effective area on each side of the piston 60. A connector 78 (Fig. 7) is provided whereby compressed air may be constantly supplied at selected pressures to the interior of the cushion cylinder to regulate the initial pressure within the cushion cylinder. To have an eighteen inch reciprocal path for the nozzles 46 the bearings 38 will have a reciprocal path of approximately eleven and one-half inches. It is therefore desirable that the cushion cylinder 54 have a maximum permissible stroke of approximately thirteen and one-quarter inches. In this embodiment the outer ends of the ports 72 are spaced about two and one-half inches from the cylinder heads to provide sufficient space to compress the air trapped at each end of the cylinder to about 500 p. s. i. Once the nozzle arms are set in motion, the force, created in each end of the cushion cylinders as the compressed air trapped therein is further compressed in decelerating and stopping the nozzle arms, is sufficient to accelerate the nozzle arms 16 in the opposite direction and thus maintain motion. Such force is estimated at approximately 20,0000 pounds. By reason of this great amount of force the time consumed in decelerating, stopping, and accelerating the nozzle arms is a small per cent of the time required for a complete oscillation (two strokes).

In order to initiate oscillation of the nozzle arms, to overcome the losses due to friction and to maintain a substantially constant velocity of the arms between the place at each end of the stroke where deceleration is commenced, the hydraulic piston rod 50 is reciprocally operated by a hydraulic power cylinder 82. The power cylinder 82 is secured to the frame 10 so that power supplied by it to the piston rod 50 will react through levers 32 and 34 on the nozzle arms 16. The piston 81 of the power cylinder has a maximum stroke of five inches. This is more than sufficient to accommodate the required movement of the crank ends of levers 32 and 34. The power cylinder 82 is operated by a source of hydraulic fluid supplied by a variable displacement pump 84 driven by an electric motor 86. The pump 84 is of standard construction well known to those skilled in the art of hydraulics. It will constantly deliver a selectable volume of hydraulic oil at a constant number of gallons per minute varying as selected from zero gallons per minute to approximately twenty-three gallons per minute. By increasing the gallons per minute of delivery from the pump the constant velocity of the power cylinder and hence the nozzle arms is increased.

Figure 3:
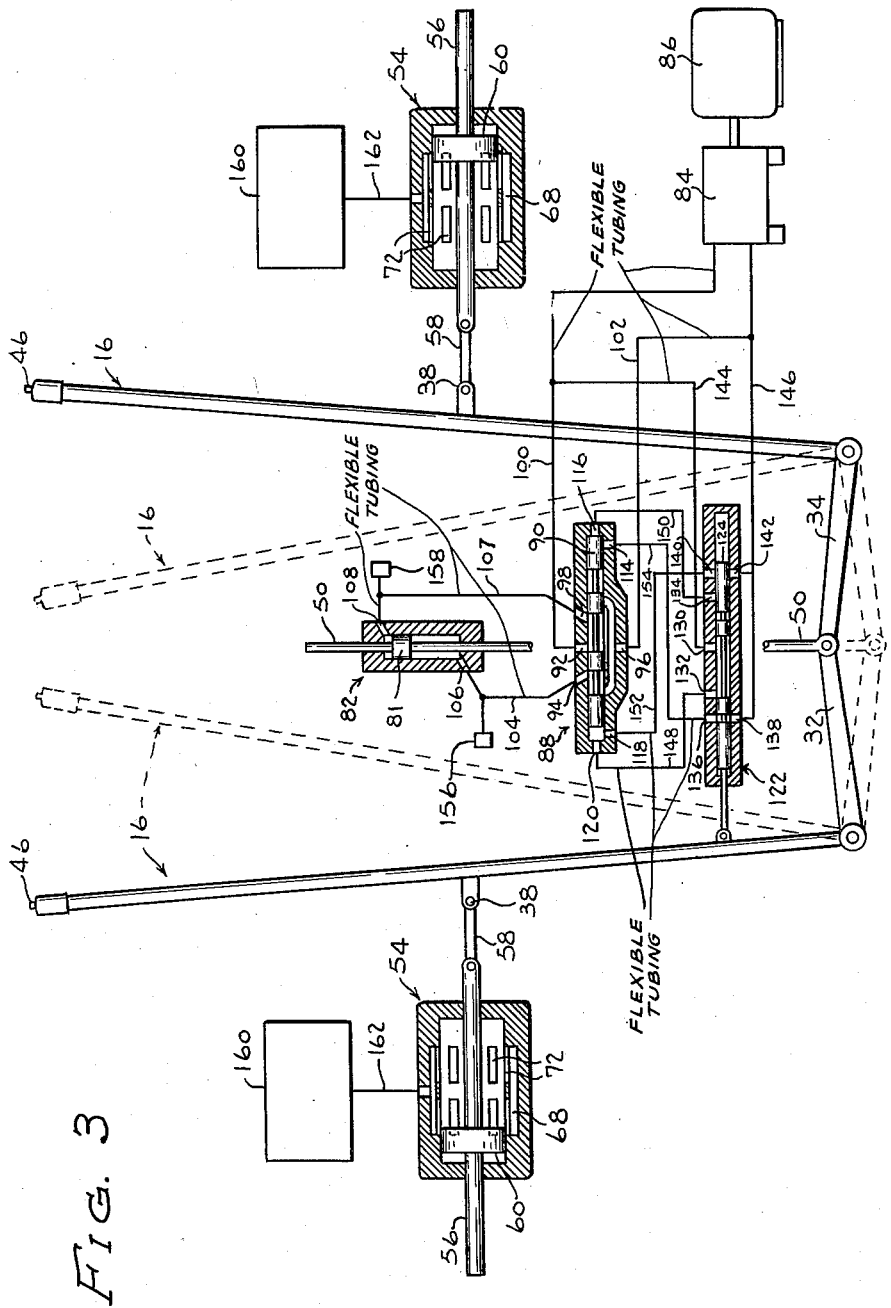
Fig. 3 is a diagrammatic view of the various elements comprising this invention and the connections therebetween.

The direction of flow of the hydraulic fluid to the power cylinder is changed in timed sequence with the decelerating, stopping, and accelerating of the nozzle arms by the cushion cylinders so that the dead center of change takes place substantially at the time of complete deceleration. A four-way, balanced, hydraulically operated control valve 88 (see Fig. 5) is secured to the frame 10 adjacent to the power cylinder 82 and is connected by suitable flexible high pressure hydraulic tubing in the hydraulic circuit shown in Fig. 3. The ports and plunger arrangement of the four-way valve are of standard construction. When the plunger 90 is moved to the left the inlet port 92 is connected to the left or lift port 94 and the outlet port 96 is connected to the right or lowering port 98. When the plunger 90 is moved to the right (see Fig. 3) the inlet port 92 is connected to the right or lowering port 98 and the outlet port 96 is connected to the left or lift port 94. The inlet port 92 is connected by flexible hydraulic tubing 100 to the pressure or delivery side of the pump 84. The outlet port 96 is connected by similar tubing 102 to the return or reservoir side of the pump 84. Lift port 94 is connected by similar tubing 104 to the lower port 106 of the pressure cylinder and lowering port 98 is connected by similar tubing 107 to the upper port 108 of such cylinder. Thus when the plunger 90 is moved to the right, as shown in Fig. 3, the delivery side of the pump 84 is connected to the upper port 108 to drive the piston rod 50 downwardly and cause the nozzle arms 16 to move toward each other. When the plunger 90 is moved to the left, as shown in Fig. 5, the delivery side of the pump 84 is connected to the lower port 106 of the power cylinder to force the piston 50 upwardly and move the nozzle arms 16 outwardly. The plunger 90 is moved from one end to the other end during the period of decelerating and accelerating the nozzle arms. To accomplish this the four-way valve 88 is provided with novel high pressure operating heads 110 and 112. The head 110 has an outlet port 114 and an inlet port 116 while the head 112 has an outlet port 118 and an inlet port 120. These ports communicate with the interior of each head and the ends of the plunger 90 to connect one end of the plunger 90 with the delivery side of the pump 84 and the other end of the plunger 90 simultaneously with the return side of such pump. Thus when the pump delivers and excess of volume of oil during the period that the travel of the power piston 81 is being decelerated and stopped, the plunger 90 will be shifted to its neutral or dead center position and thence to its opposite position.

In order to connect the ports of the four-way valve operating heads to the proper sides of the pump, a pilot valve 122 operated by the movement of one of the nozzle arms 16 is utilized. The plunger 124 of such valve is adjustably connected by rod 125 and linkage 126 to the central pipe 20 of one of the nozzle arms 16, and its body is mounted to the frame 14 by bracket 128 so that as the nozzle arm 16 oscillates the plunger 124 will be moved back and forth. Construction of the pilot valve is shown in detail in Fig. 4. Its body is made up of two halves fastened together at a flanged intersection. A central inlet port 130 communicates with outlet port 132 when the plunger 124 is at its left position and with outlet port 134 when the plunger is in its right position. A return port 136 is connected to an outlet port 138 when the plunger 124 is in left position (see Fig. 3), and a return port 140 is connected with an outlet port 142 when the plunger 124 is in the right position, as indicated in Fig. 4. In between these two positions the plunger 124 blocks off all of the ports. The pilot valve inlet port 130 is connected to the delivery side of the pump 84 by flexible pressure tubing 144, and each of the outlet ports 138 and 142 is connected to the return side of the pump 84 by similar tubing 146. The outlet port 132 is connected by flexible pressure tubing 148 to the inlet port 120 of the four-way valve operating head 112. The outlet port 134 is connected by similar tubing 150 to the inlet port 116 of the four-way valve operating head 110. The outlet port 118 of the four-way valve is connected by flexible pressure tubing 152 to the return port 140 of the pilot valve and the outlet port 114 is connected by similar tubing 154 to the return port 136. As so connected the pressure or delivery side of the pump 84 will be alternately connected to the heads 110 and 112 at the time the nozzle arms 16 start to be decelerated by the action of the cushion cylinder 54 as its piston 60 closes off the ports 72 and starts to compress the air trapped in the closed ends of such cylinder. The pilot valve plunger 124 has approximately a three and one-half inch stroke and is connected to the nozzle arm approximately seventeen inches from its pivotal axis. This relationship insures that as the piston 60 reaches and closes off the outer ends of ports 72, the plunger 124 starts to open either port 132 or port 134 and to connect either port 136 or port 140 to their respective outlet ports 138 or 142. This means that fluid delivered from the pump 84 will at that time be suppliable to both the power cylinder 82 and one of the operating heads of the four-way valve. After that time the action of the cushion cylinder 54 decelerates the power piston 81 to create an excess of the volume of fluid constantly furnished by the pump. This excess will be supplied to the operating head of the four-way valve and start to move the plunger 90. At the time the movement of the piston 81 is stopped the plunger 90 will then momentarily reach its neutral or valve-locking position. However, the continued supply of hydraulic fluid from the pump 84 will move the plunger 90 past the blocked position. During the time that the piston 81 is being accelerated by the action of the cushion cylinder the hydraulic fluid from the pump 84 will be furnished to the then following side of the piston 81. The acceleration action of the cushion cylinders 54 continues until the following edge of the piston 60 opens the ports 72. During this time the velocity of the piston 81 has been brought up to the constant velocity determined by the flow of oil from the delivery side of the pump 84 and the piston will thereafter continue its stroke at that constant velocity until deceleration is commenced when the cushion cylinder piston 60 closes the ports 72 at the other end. Because the reversal takes place in milli-seconds of time it is impossible to obtain exact timing. However, any errors in timing are compensated for by the inherent characteristics of the flexible pressure tubing. This tubing will expand or contract sufficiently to relieve the system of shock that occurs as the result of slight variance in timing. In addition there is provided a pair of relief valves 156 and 158 of standard design which, if the hydraulic pressure unduly increases, momentarily open to bleed some of the hydraulic fluid out of the system. Some correction of the timing can be accomplished by varying the initial pressure of the air within each of the cushion cylinders 54. Under normal situations compressed air from a source 160 is furnished through pipes 162 and connectors 78 to the interior of the cushion cylinder at about 60 to 80 p. s. i. If it is desired to increase the time of deceleration the initial pressure is decreased. To decrease the time of deceleration it is only necessary to increase the initial pressure. Some control over the length of reciprocal paths of piston 60 and nozzles 46 is also accomplished by varying the initial pressure of the air within each of the cushion cylinders 54. To increase the stroke it is only necessary to decrease the initial pressure.

One complete oscillation (two successive strokes) will now be described. In Fig. 3 the parts are shown after deceleration of the outward movement of the nozzle arms has been completed and they are commencing to move inwardly. At this time hydraulic fluid is being furnished by the pump 84 to the upper side of piston 81. As the nozzle arms 16 move inwardly under the force of the cushion cylinders, the piston 60 will open the ports 72 and thereafter furnish no force. At the time these ports are opened, the pilot valve 122 will reach neutral position locking the four-way valve 88 in the position shown. When the pistons 60 reach the inside end of ports 72, deceleration will commence. At this time the pilot valve 122 will have reached its right-hand position shown in Fig. 4, and fluid from the delivery side of pump 84 may then be delivered both to the upper side of piston 81 and to the operating head 110 of the four-way valve. The following deceleration of the piston 60 creates a surplus of hydraulic fluid which flows into the inlet port 116 of valve 88 moving the plunger 90 toward the left. If the engine is properly timed the plunger will reach its blocking position just as the piston 81 is completely decelerated. However, the plunger 90 will stay in this position only a fraction of a milli-second and the continuous supply of hydraulic fluid will move it to its left position shown in Fig. 5. After the plunger 90 leaves its blocked position, hydraulic fluid will be furnished to the lower inlet port 106 of power cylinder 82. The piston 81 will then commence to move upwardly under the force created in the cushion cylinders and as this force is exhausted, by the pistons 60 uncovering the inside ends of ports 72, the constant flow of hydraulic fluid will continue the upward movement of the piston 81 at a constant velocity. At the time of uncovering the ports 72 the plunger 124 of the pilot valve 122 will have closed all its ports and locked the four-way valve in the position shown in Fig. 5. When the pistons 60 close the outside ends of ports 72, the pilot valve 122 will then shift to open its ports as shown in Fig. 3 and the supply of hydraulic fluid is then again connected to the four-way valve operating head 112 and such valve will shift from the position shown in Fig. 5 through the blocked position to the position shown in Fig. 3 as the nozzle arms are decelerated and an oscillation will have been completed.

Although only one embodiment of the invention is shown and described herein, it will be understood that this application is intended to cover such changes or modifications as come within the spirit of the invention or scope of the following claims.

I claim:

1. A reciprocatory engine comprising an operating member mounted for oscillatory movement, a source of fluid power for furnishing hydraulic medium at a selected constant volumetric flow, a hydraulic power cylinder for operating said member, a four-way valve connected between said source and said power cylinder to control the flow of hydraulic medium to said cylinder to cause it to alternately move said operating member in opposite directions at constant velocity, a double acting cushion cylinder charged with a compressible medium and disconnected from said power cylinder and associated with said member to stop and start said member at each end of its stroke, and a pilot valve operated by said member to momentarily place said four-way valve under the control of said source of power and said cushion cylinder.

2. In a reciprocal engine having an operating member operated between reversals of direction at a constant velocity by means of a hydraulically power-operated cylinder and a source of fluid power furnishing hydraulic medium at constant volumetric flow, a double acting cushion cylinder charged with a compressible medium and disconnected from said power-operated cylinder, said cushion cylinder having traps at each end thereof whereby said compressible medium is compressed at each end of the stroke of said member to stop and start said member.

3. An engine for producing oscillating motion comprising an operating member, a reciprocal hydraulically operated power cylinder for supplying constant velocity to said member in alternately opposite directions, a source of fluid power under selected constant volumetric flow, means for controlling the flow of fluid from said source to said cylinder, and a double acting cushion cylinder charged with a compressible medium and disconnected from said power cylinder and operated by said member to trap and compress said compressible medium at each end portion of the stroke thereof to stop and start said member at each end of the stroke of said member, the time consumed in stopping and starting said member by said cushion cylinder being utilized to create an excess of fluid medium from said source to control the operation of said means.

4. An engine as claimed in claim 3 in which the cushion cylinder is constantly supplied with a compressible medium under pressure in excess of atmosphere which pressure may be selectively altered to effect a change in the time consumed in stopping and starting said member or to change the length of its reciprocal path.

5. In a reciprocal engine having an operating member mounted for oscillatory movement, the starting and stopping of which at each end portion of its stroke is accomplished by a double acting cushion cylinder charged with a compressible medium, a hydraulic cylinder actuated from a source of fluid power supplying hydraulic medium at constant volumetric flow for operating said member at a constant velocity between said starting and stopping, said cushion cylinder being disconnected from said hydraulic cylinder, and means constantly connected with said operating member for synchronizing the operation of said cylinder with the starting and stopping of said member.

6. A reciprocatory engine as claimed in claim 5 in which said means comprises a pilot valve constantly connected with said operating member and a four-way valve the operation of which is controlled by the excess of fluid medium furnished from said source during the time required for the reversal of said member.

7. A reciprocal engine comprising a pivoted operating member oscillating for the purpose of performing useful work, a reciprocal hydraulically operated power cylinder having a piston connected with said operating member to move said member at a constant velocity between the starting and stopping thereof at the end portion of each stroke of said member, a source of fluid power for furnishing a hydraulic medium at selected constant volumetric flow, a four-way valve hydraulically operated by pistons reciprocating in cylinders at each end thereof for alternately connecting the ends of said power cylinder to said source and at the same time connecting a respective opposed end of said power cylinder to a return leading to said source, a pilot valve hydraulically connected with said four-way valve and said source and constantly connected with and operated by the movement of said member as it approaches the end portion of each stroke to connect said source of power to an operating cylinder at a selected end of said four-way valve and at the same time to connect the other operating cylinder of said four-way valve to the return to said source of power, and a double acting cushion cylinder charged with a compressible medium and disconnected from said power cylinder and having a piston connected to said operating member and adapted to compress said compressible medium during each end portion of the stroke of said member at each end of its stroke, the time required for said cylinder to stop said member being of sufficient duration to permit enough medium from said source to enter into the selected operating cylinder of said four-way valve to cause said valve to shift as said member is stopped and to connect the source of fluid power with the opposite end of said power cylinder.

8. A reciprocal engine as claimed in claim 7 in which the cushion cylinder has a middle port the ends of which are spaced from the ends of the cylinder to provide compression ends in which said compressible medium is compressed to receive energy from and deliver energy to said operating member as its motion in one direction is stopped and its motion in the opposite direction started.

9. A reciprocal engine as claimed in claim 8 in which said pilot valve is timed to connect the source of power to the four-way valve as the piston of said cushion cylinder reaches the ends of said port.

10. An oscillator comprising a base, a pair of arms pivotally mounted to said base at their lower ends for oscillating movement toward and away from each other, a lever attached to each arm at its pivoted end, a power cylinder secured to said frame and having a piston rod linked to said levers whereby reciprocal movement of said piston rod will cause said arms to oscillate, a source of fluid power, means for controlling the application of said fluid power to said power cylinder to cause said piston rod to have alternating reciprocal action at constant velocity between periods of reversal, and cushion cylinders mounted on said frame and connected with said arms intermediate the ends thereof to stop and start the movement of said arms at each end of the stroke thereof.

VINCENT R. NOLL.

REFERENCES CITED

The following references are of record in the file of this patent:

UNITED STATES PATENTS

| Number | Name | Date |
|---|---|---|
| 344,222 | Thomas | June 22, 1886 |
| 845,827 | Steedman | Mar. 5, 1907 |
| 897,676 | Thompson | Sept. 1, 1908 |
| 1,216,221 | Erickson et al. | Feb. 13, 1917 |
| 1,619,475 | Hubbard | Mar. 1, 1927 |
| 1,744,514 | Thompson | Jan. 21, 1930 |
| 2,045,945 | Carr | June 30, 1936 |
| 2,322,271 | Bagley | June 22, 1943 |
| 2,363,142 | Reed | Nov. 21, 1944 |